(12) United States Patent
Tokuno

(10) Patent No.: US 11,726,300 B2
(45) Date of Patent: Aug. 15, 2023

(54) IMAGING LENS

(71) Applicant: TOKYO VISIONARY OPTICS CO., LTD., Tokyo (JP)

(72) Inventor: Koki Tokuno, Tokyo (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 172 days.

(21) Appl. No.: 16/895,518

(22) Filed: Jun. 8, 2020

(65) Prior Publication Data
US 2021/0157100 A1  May 27, 2021

(30) Foreign Application Priority Data

Sep. 4, 2019  (JP) .................................. 2019-160974

(51) Int. Cl.
*G02B 9/60* (2006.01)
*G02B 13/00* (2006.01)

(52) U.S. Cl.
CPC ........... *G02B 13/0045* (2013.01); *G02B 9/60* (2013.01)

(58) Field of Classification Search
CPC ... G02B 9/60; G02B 9/62; G02B 9/64; G02B 13/0045; G02B 13/005; G02B 13/02
USPC .................. 359/763–764, 754–757
See application file for complete search history.

(56) References Cited

U.S. PATENT DOCUMENTS

| | | | | |
|---|---|---|---|---|
| 9,402,032 | B2* | 7/2016 | Dror | G02B 27/0025 |
| 2017/0146777 | A1* | 5/2017 | Dror | G02B 9/60 |
| 2018/0164548 | A1* | 6/2018 | Wang | G02B 9/60 |
| 2019/0056570 | A1* | 2/2019 | Yeh | G02B 13/0045 |
| 2019/0121081 | A1* | 4/2019 | Huang | G02B 13/18 |
| 2020/0049948 | A1* | 2/2020 | Kuo | G02B 27/0037 |
| 2021/0055524 | A1* | 2/2021 | Peng | G02B 27/0025 |
| 2021/0231922 | A1* | 7/2021 | Sekine | G02B 13/0045 |

FOREIGN PATENT DOCUMENTS

| | | |
|---|---|---|
| CN | 108152936 | 6/2018 |
| CN | 109298514 | 2/2019 |
| CN | 109407284 | 3/2019 |

* cited by examiner

*Primary Examiner* — Christopher Stanford
(74) *Attorney, Agent, or Firm* — Hamre, Schumann, Mueller & Larson, P.C.

(57) ABSTRACT

There is provided an imaging lens with excellent optical characteristics which satisfies demand of a low profile and a low F-number. An imaging lens comprises in order from an object side to an image side, a first lens with positive refractive power having an object-side surface being convex in a paraxial region, a second lens with negative refractive power having an object-side surface being convex in a paraxial region, a third lens with negative refractive power having an image-side surface being concave in a paraxial region, a fourth lens with positive refractive power in a paraxial region, and a fifth lens with negative refractive power having an object-side surface being concave in a paraxial region, and predetermined conditional expressions are satisfied.

6 Claims, 4 Drawing Sheets

IMAGING LENS

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as information terminal equipment, home appliances, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in the following Patent Document 1 has been known.

Patent Document 1 (CN109407284A) discloses an imaging lens comprising, in order from an object side, a first lens with positive refractive power having a convex object-side surface, a second lens with negative refractive power, a third lens with negative refractive power having a concave image-side surface, a fourth lens with positive or negative refractive power, and a fifth lens with negative refractive power having a concave object-side surface, and a relationship between a total track length and a focal length of the overall optical system, and a relationship between the focal length of the overall optical system and a half value of an image height satisfy a certain condition.

SUMMARY OF THE INVENTION

However, in lens configurations disclosed in the Patent Document 1, when a low profile and a low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the low profile and the low F-number in well balance and excellently corrects aberrations.

Regarding terms used in the present invention, "a convex surface (a surface being convex)", "a concave surface (a surface being concave)" or "a flat surface (a surface being flat)" of lens surfaces implies a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens with positive refractive power having an object-side surface being convex in a paraxial region, a second lens with negative refractive power having an object-side surface being convex in a paraxial region, a third lens with negative refractive power having an image-side surface being concave in a paraxial region, a fourth lens with positive refractive power in a paraxial region, and a fifth lens with negative refractive power having an object-side surface being concave in a paraxial region.

According to the imaging lens having an above-described configuration, the first lens achieves reduction in a profile of the imaging lens by strengthening the refractive power. Furthermore, when the first lens has the object-side surface being convex in the paraxial region, spherical aberration and distortion are suppressed.

The second lens properly corrects the spherical aberration and chromatic aberration. When the second lens has the object-side surface being convex in the paraxial region, coma aberration, astigmatism and the distortion are properly corrected.

The third lens properly corrects the chromatic aberration and the coma aberration. When the third lens has the image-side surface being concave in the paraxial region, the astigmatism and the distortion are properly corrected.

The fourth lens achieves reduction in the profile, and properly corrects the astigmatism, field curvature and the distortion.

The fifth lens properly corrects the chromatic aberration, the astigmatism, the field curvature and the distortion. The object-side surface of the fifth lens is concave in the paraxial region and a light ray incident angle to the fifth lens is appropriately controlled. As a result, the astigmatism, the field curvature and the distortion are more properly corrected.

According to the imaging lens having the above-described configuration, it is preferable that the following conditional expression (1) is satisfied:

$$9.00 < vd4 < 29.00 \tag{1}$$

where
vd4: an abbe number at d-ray of the fourth lens.

The conditional expression (1) defines an appropriate range of the abbe number at d-ray of the fourth lens. By satisfying the conditional expression (1), the chromatic aberration can be properly corrected.

According to the imaging lens having the above-described configuration, it is preferable that the following conditional expression (2) is satisfied:

$$3.70 < |r1 \times |r2|/f < 8.75 \tag{2}$$

where
r1: a paraxial curvature radius of an object-side surface of the first lens,
r2: a paraxial curvature radius of an image-side surface of the first lens, and
f: a focal length of the overall optical system of the imaging lens.

The conditional expression (2) defines an appropriate range of a relationship among the paraxial curvature radius of the object-side surface of the first lens, the paraxial curvature radius of the image-side surface of the first lens, and the focal length of the overall optical system of the imaging lens. By satisfying the conditional expression (2), reduction in the profile can be achieved, and the spherical aberration, the coma aberration, the astigmatism and the distortion can be suppressed.

According to the imaging lens having the above-described configuration, it is preferable that the following conditional expression (3) is satisfied:

$$-1.00 < r3/r7 < -0.25 \qquad (3)$$

where
r3: a paraxial curvature radius of an object-side surface of the second lens, and
r7: a paraxial curvature radius of an object-side surface of the fourth lens.

The conditional expression (3) defines an appropriate range of a relationship between the paraxial curvature radius of the object-side surface of the second lens and the paraxial curvature radius of the object-side surface of the fourth lens. By satisfying the conditional expression (3), the astigmatism, the field curvature and the distortion can be properly corrected.

According to the imaging lens having the above-described configuration, it is preferable that the following conditional expression (4) is satisfied:

$$3.25 < (D4/f4) \times 100 < 9.50 \qquad (4)$$

where
D4: a thickness along the optical axis of the fourth lens, and
f4: a focal length of the fourth lens.

The conditional expression (4) defines an appropriate range of a relationship between the thickness along the optical axis of the fourth lens and the focal length of the fourth lens. By satisfying the conditional expression (4), reduction in the low profile can be achieved, and the astigmatism, the field curvature and the distortion can be properly corrected.

According to the imaging lens having the above-described configuration, it is preferable that the following conditional expression (5) is satisfied:

$$2.30 < |r2|/f < 7.00 \qquad (5)$$

where
r2: a paraxial curvature radius of an image-side surface of the first lens, and
f: a focal length of the overall optical system of the imaging lens.

The conditional expression (5) defines an appropriate range of the paraxial curvature radius of the image-side surface of the first lens. By satisfying the conditional expression (5), the spherical aberration, the coma aberration, the astigmatism and the distortion can be properly corrected.

According to the imaging lens having the above-described configuration, it is preferable that the following conditional expression (6) is satisfied:

$$-17.00 < |r2|/r8 < -3.50 \qquad (6)$$

where
r2: a paraxial curvature radius of an image-side surface of the first lens, and
r8: a paraxial curvature radius of an image-side surface of the fourth lens.

The conditional expression (6) defines an appropriate range of a relationship between the paraxial curvature radius of the image-side surface of the first lens and the paraxial curvature radius of the image-side surface of the fourth lens. By satisfying the conditional expression (6), the coma aberration, the astigmatism, the field curvature and the distortion can be properly corrected.

According to the imaging lens having the above-described configuration, it is preferable that the following conditional expression (7) is satisfied:

$$1.30 < |r5|/r6 < 3.00 \qquad (7)$$

where
r5: a paraxial curvature radius of an object-side surface of the third lens, and
r6: a paraxial curvature radius of an image-side surface of the third lens.

The conditional expression (7) defines an appropriate range of a relationship between the paraxial curvature radius of the object-side surface of the third lens and the paraxial curvature radius of the image-side surface of the third lens. By satisfying the conditional expression (7), the coma aberration, the astigmatism and the distortion can be properly corrected.

According to the imaging lens having the above-described configuration, it is preferable that the following conditional expression (8) is satisfied:

$$0.80 < |r5|/r6/r1 < 2.20 \qquad (8)$$

where
r5: a paraxial curvature radius of an object-side surface of the third lens,
r6: a paraxial curvature radius of an image-side surface of the third lens, and
r1: a paraxial curvature radius of an object-side surface of the first lens.

The conditional expression (8) defines an appropriate range of a relationship among the paraxial curvature radius of the object-side surface of the third lens, the paraxial curvature radius of the image-side surface of the third lens, and the paraxial curvature radius of the object-side surface of the first lens. By satisfying the conditional expression (8), the spherical aberration, the coma aberration, the astigmatism and the distortion can be properly corrected.

According to the imaging lens having the above-described configuration, it is preferable that the following conditional expression (9) is satisfied:

$$1.20 < f4/f < 3.00 \qquad (9)$$

where
f4: a focal length of the fourth lens, and
f: a focal length of the overall optical system of the imaging lens.

The conditional expression (9) defines an appropriate range of the focal length of the fourth lens. By satisfying the conditional expression (9), reduction in the profile can be achieved, and the astigmatism, the field curvature and the distortion can be properly corrected.

According to the imaging lens having the above-described configuration, it is preferable that the following conditional expression (10) is satisfied:

$$47.00 < vd3 < 67.00 \qquad (10)$$

where
vd3: an abbe number at d-ray of the third lens.

The conditional expression (10) defines an appropriate range of the abbe number at d-ray of the third lens. By satisfying the conditional expression (10), the chromatic aberration can be properly corrected.

According to the imaging lens having the above-described configuration, it is preferable that the following conditional expression (11) is satisfied:

$$1.50 < (T2/f) \times 100 < 7.00 \qquad (11)$$

where
T2: a distance along the optical axis from an image-side surface of the second lens to an object-side surface of the third lens, and
f: a focal length of the overall optical system of the imaging lens.

The conditional expression (11) defines an appropriate range of the distance along the optical axis from the image-side surface of the second lens to the object-side surface of the third lens. By satisfying the conditional expression (11), reduction in the profile can be achieved, a light ray incident angle to the object-side surface of the third lens can be appropriately controlled, and the astigmatism and the distortion can be properly corrected.

According to the imaging lens having the above-described configuration, it is preferable that the following conditional expression (12) is satisfied:

$$0.05<D3/(T3-T2)<0.30 \tag{12}$$

where
D3: a thickness along the optical axis of the third lens,
T3: a distance along the optical axis from an image-side surface of the third lens to an object-side surface of the fourth lens, and
T2: a distance along the optical axis from an image-side surface of the second lens to an object-side surface of the third lens.

The conditional expression (12) defines an appropriate range of a relationship among the thickness along the optical axis of the third lens, the distance along the optical axis from the image-side surface of the third lens to the object-side surface of the fourth lens, and the distance along the optical axis from the image-side surface of the second lens to the object-side surface of the third lens. By satisfying the conditional expression (12), the third lens is arranged at an optimum position, and aberration correction function of the lens becomes more effective. As a result, reduction in the profile can be achieved, and the astigmatism and the distortion can be properly corrected.

According to the imaging lens having the above-described configuration, it is preferable that the following conditional expression (13) is satisfied:

$$1.90<D4/T4<7.00 \tag{13}$$

where
D4: a thickness along the optical axis of the fourth lens, and
T4: a distance along the optical axis from an image-side surface of the fourth lens to an object-side surface of the fifth lens.

The conditional expression (13) defines an appropriate range of a relationship between the thickness along the optical axis of the fourth lens and the distance along the optical axis from the image-side surface of the fourth lens to the object-side surface of the fifth lens. By satisfying the conditional expression (13), reduction in the profile can be achieved, a light ray incident angle to the object-side surface of the fifth lens can be appropriately controlled, and the astigmatism and the distortion can be properly corrected.

According to the imaging lens having the above-described configuration, it is preferable that the following conditional expression (14) is satisfied:

$$1.60<(T4/f)\times100<6.00 \tag{14}$$

where
T4: a distance along the optical axis from an image-side surface of the fourth lens to an object-side surface of the fifth lens, and
f: a focal length of the overall optical system of the imaging lens.

The conditional expression (14) defines an appropriate range of the distance along the optical axis from the image-side surface of the fourth lens to the object-side surface of the fifth lens. By satisfying the conditional expression (14), reduction in the profile can be achieved, and the astigmatism and the distortion can be properly corrected.

According to the imaging lens having the above-described configuration, it is preferable that the following conditional expression (15) is satisfied:

$$-6.00<|r2|/r3/r8<-0.55 \tag{15}$$

where
r2: a paraxial curvature radius of an image-side surface of the first lens,
r3: a paraxial curvature radius of an object-side surface of the second lens, and
r8: a paraxial curvature radius of an image-side surface of the fourth lens.

The conditional expression (15) defines an appropriate range of a relationship among the paraxial curvature radius of the image-side surface of the first lens, the paraxial curvature radius of the object-side surface of the second lens, and the paraxial curvature radius of the image-side surface of the fourth lens. By satisfying the conditional expression (15), the spherical aberration, the coma aberration, the astigmatism, the field curvature and the distortion can be properly corrected.

According to the imaging lens having the above-described configuration, it is preferable that the following conditional expression (16) is satisfied:

$$-100.00<r7/T2<-11.50 \tag{16}$$

where
r7: a paraxial curvature radius of an object-side surface of the fourth lens, and
T2: a distance along the optical axis from an image-side surface of the second lens to an object-side surface of the third lens.

The conditional expression (16) defines an appropriate range of a relationship between the paraxial curvature radius of the object-side surface of the fourth lens and the distance along the optical axis from the image-side surface of the second lens to the object-side surface of the third lens. By satisfying the conditional expression (16), reduction in the profile can be achieved, and the astigmatism, the field curvature and the distortion can be properly corrected.

According to the imaging lens having the above-described configuration, it is preferable that the following conditional expression (17) is satisfied:

$$-15.00<r7/(T3-T2)<-1.50 \tag{17}$$

where
r7: a paraxial curvature radius of an object-side surface of the fourth lens,
T3: a distance along the optical axis from an image-side surface of the third lens to an object-side surface of the fourth lens, and
T2: a distance along the optical axis from an image-side surface of the second lens to an object-side surface of the third lens.

The conditional expression (17) defines an appropriate range of a relationship among the paraxial curvature radius of the object-side surface of the fourth lens, the distance along the optical axis from the image-side surface of the third lens to the object-side surface of the fourth lens, and the distance along the optical axis from the image-side surface of the second lens to the object-side surface of the third lens. By satisfying the conditional expression (17), refractive power of the object-side surface of the fourth lens can be maintained, the third lens is arranged at an optimum position, and aberration correction function of the lens becomes more effective. As a result, reduction in the profile can be achieved, and the astigmatism, the field curvature and the distortion can be properly corrected.

According to the imaging lens having the above-described configuration, it is preferable that the following conditional expression (18) is satisfied:

$$0.15<f1/f4<0.35 \quad (18)$$

where
f1: a focal length of the first lens, and
f4: a focal length of the fourth lens.

The conditional expression (18) defines an appropriate range of a relationship between the focal length of the first lens and the focal length of the fourth lens. By satisfying the conditional expression (18), refractive powers of the first lens and the fourth lens can be appropriately balanced. As a result, reduction in the profile can be achieved, the spherical aberration, the coma aberration, the astigmatism, the field curvature and the distortion can be properly corrected.

According to the imaging lens having the above-described configuration, it is preferable that the following conditional expression (19) is satisfied:

$$-0.55<f2/f4<-0.30 \quad (19)$$

where
f2: a focal length of the second lens, and
f4: a focal length of the fourth lens.

The conditional expression (19) defines an appropriate range of a relationship between the focal length of the second lens and the focal length of the fourth lens. By satisfying the conditional expression (19), refractive powers of the second lens and the fourth lens can be appropriately balanced. As a result, the chromatic aberration, the spherical aberration, the coma aberration, the astigmatism, the field curvature and the distortion can be properly corrected.

Effect of Invention

According to the present invention, there can be provided an imaging lens with high resolution which satisfies demand of the low profile and the low F-number in well balance, and properly corrects aberrations.

DETAILED DESCRIPTION OF THE PREFERRED EMBODIMENT

Hereinafter, the preferred embodiment of the present invention will be described in detail referring to the accompanying drawings.

FIGS. 1, 3, 5 and 7 are schematic views of the imaging lenses in Examples 1 to 4 according to the embodiments of the present invention, respectively.

The imaging lens according to the present invention comprises, in order from an object side to an image side, a first lens L1 with positive refractive power having an object-side surface being convex in a paraxial region, a second lens L2 with negative refractive power having an object-side surface being convex in a paraxial region, a third lens L3 with negative refractive power having an image-side surface being concave in a paraxial region, a fourth lens L4 with positive refractive power in a paraxial region, and a fifth lens L5 with negative refractive power having an object-side surface being concave in a paraxial region.

A filter IR such as an IR cut filter and a cover glass are arranged between the fifth lens L5 and an image plane IMG (namely, the image plane of an image sensor). The filter IR is omissible.

By arranging an aperture stop ST between the second lens L2 and the third lens L3, correction of the distortion become facilitated. A position of the aperture stop ST is not limited to that between the second lens L2 and the third lens L3. The aperture stop ST may be appropriately arranged according to a specification of the image sensor.

The first lens L1 has the positive refractive power and is formed in a meniscus shape having the object-side surface being convex and an image-side surface being concave in a paraxial region (near the optical axis X). Therefore, reduction in a profile is achieved, and spherical aberration, coma aberration, astigmatism and distortion are suppressed by strengthening the refractive power.

Figure 3:
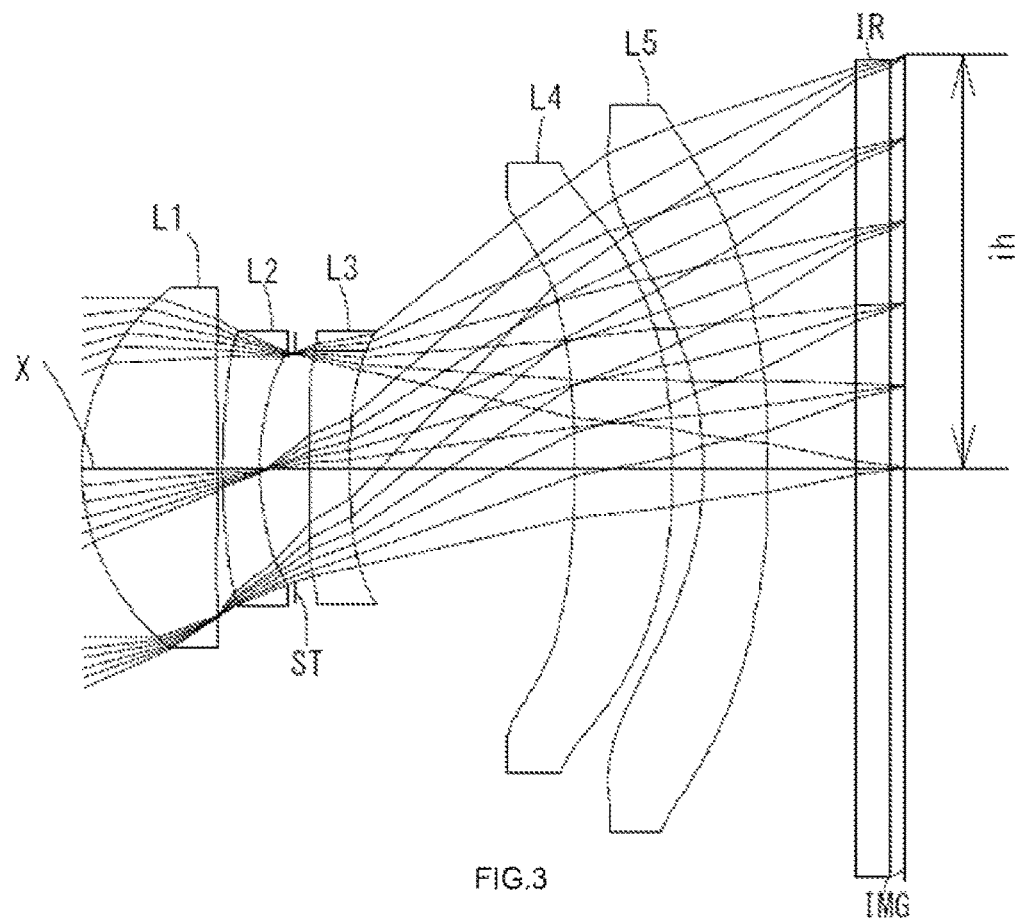
FIG. 3 is a schematic view showing an imaging lens in Example 2 according to the present invention.
Figure 5:
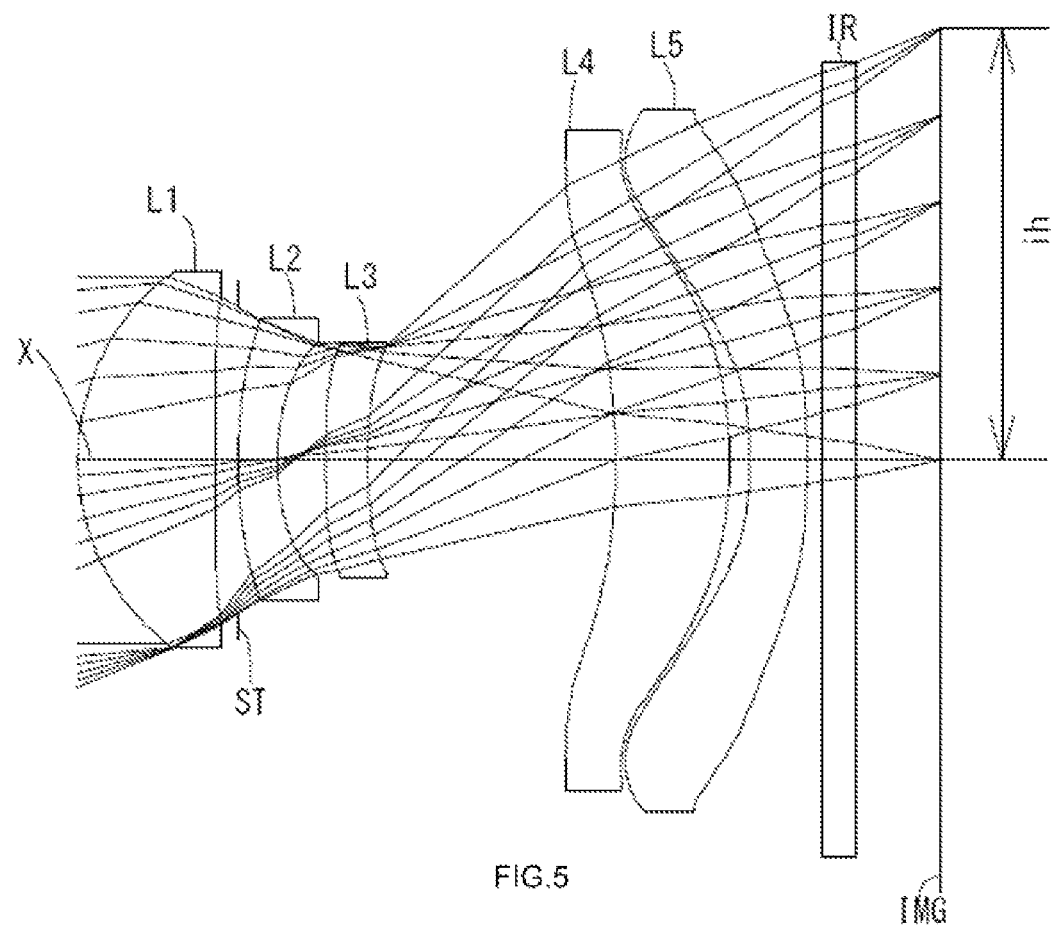
FIG. 5 is a schematic view showing an imaging lens in Example 3 according to the present invention.
Figure 7:
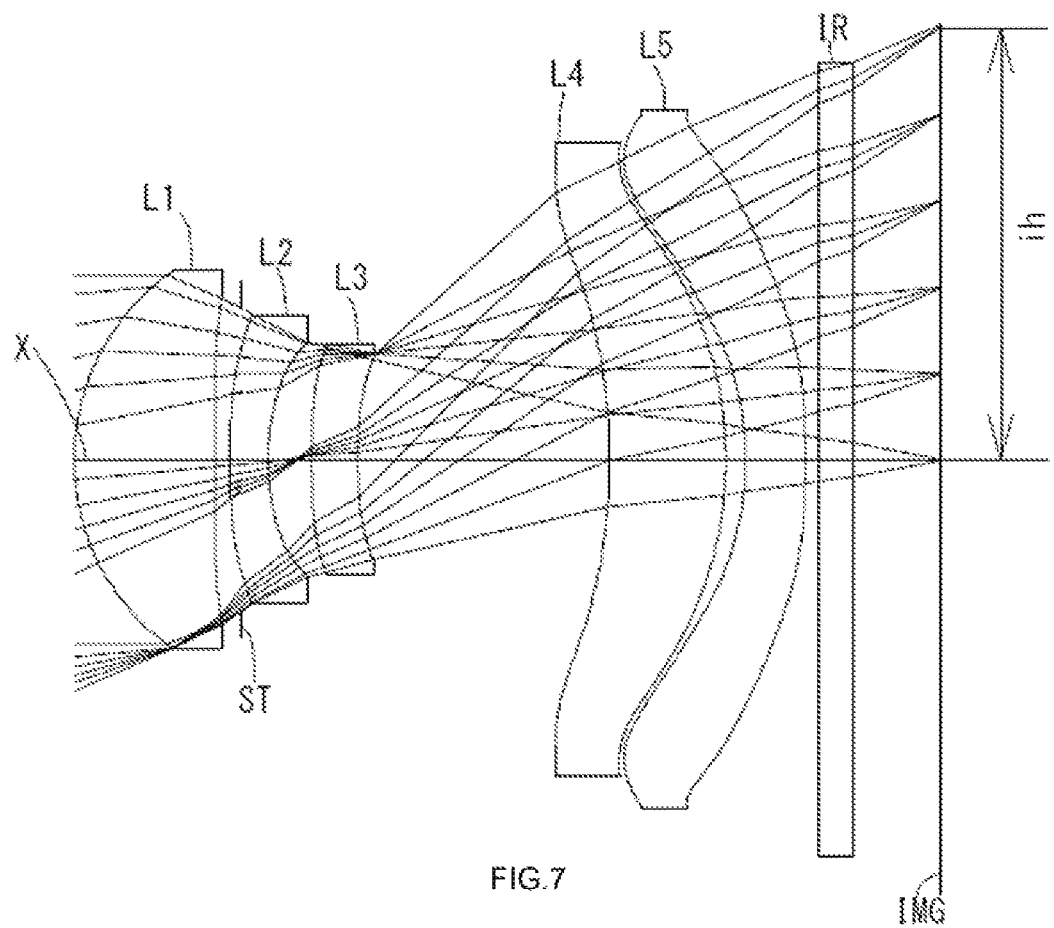
FIG. 7 is a schematic view showing an imaging lens in Example 4 according to the present invention.

The first lens L1 may be formed in a biconvex shape having the object-side surface and the image-side surface being both convex in the paraxial region as in Examples 2, 3 and 4 as shown in FIGS. 3, 5 and 7. In this case, positive refractive powers of both surfaces are favorable for reduction in the profile.

The second lens L2 has the negative refractive power and is formed in a meniscus shape having the object-side surface being convex and an image-side surface being concave in a paraxial region (near the optical axis X). Therefore, the spherical aberration, chromatic aberration, the coma aberration, the astigmatism and the distortion are properly corrected.

The third lens L3 has the negative refractive power and is formed in a meniscus shape having an object-side surface being convex and the image-side surface being concave in a paraxial region (near the optical axis X). Therefore, the chromatic aberration, the coma aberration, the astigmatism and the distortion are properly corrected.

The third lens L3 may be formed in a biconcave shape having the object-side surface and the image-side surface being both concave in the paraxial region as in Example 2 as shown in FIG. 3. In this case, the chromatic aberration can be more properly corrected by negative refractive powers of both surfaces.

The fourth lens L4 has positive refractive power and is formed in a meniscus shape having an object-side surface being concave and an image-side surface being convex in a paraxial region (near the optical axis X). Therefore, reduction in the profile is achieved, and the astigmatism, field curvature and the distortion are properly corrected.

The fifth lens L5 has the negative refractive power and is formed in a meniscus shape having the object-side surface being concave and an image-side surface being convex in a paraxial region (near the optical axis X). Therefore, the chromatic aberration, the astigmatism, the field curvature and the distortion are properly corrected.

The fifth lens L5 may be formed in a shape having the object-side surface being concave and the image-side surface being flat shape in the paraxial region as in Example 2 as shown in FIG. 3. In this case, the image-side surface of the fifth lens L5 does not affect a focal length of the overall optical system of the imaging lens, and the astigmatism, the field curvature and the distortion are properly corrected by aspheric surfaces on both the object side and the image side.

Regarding the imaging lens according to the present embodiments, it is preferable that all lenses of the first lens L1 to the fifth lens L5 are single lenses. Configuration only with the single lenses can frequently use the aspheric surfaces. In the present embodiments, all lens surfaces are formed as appropriate aspheric surfaces, and the aberrations are favorably corrected. Furthermore, in comparison with a case in which a cemented lens is used, workload is reduced, and manufacturing in low cost can be realized.

Furthermore, the imaging lens according to the present embodiments makes manufacturing facilitated by using a plastic material for the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the following conditional expressions (1) to (19).

$$9.00 < vd4 < 29.00 \tag{1}$$

$$3.70 < r1 \times |r2|/f < 8.75 \tag{2}$$

$$-1.00 < r3/r7 < -0.25 \tag{3}$$

$$3.25 < (D4/f4) \times 100 < 9.50 \tag{4}$$

$$2.30 < |r2|/f < 7.00 \tag{5}$$

$$-17.00 < |r2|/r8 < -3.50 \tag{6}$$

$$1.30 < |r5|/r6 < 3.00 \tag{7}$$

$$0.80 < |r5|/r6/r1 < 2.20 \tag{8}$$

$$1.20 < f4/f < 3.00 \tag{9}$$

$$47.00 < vd3 < 67.00 \tag{10}$$

$$1.50 < (T2/f) \times 100 < 7.00 \tag{11}$$

$$0.05 < D3/(T3-T2) < 0.30 \tag{12}$$

$$1.90 < D4/T4 < 7.00 \tag{13}$$

$$1.60 < (T4/f) \times 100 < 6.00 \tag{14}$$

$$-6.00 < |r2|/r3/r8 < -0.55 \tag{15}$$

$$-100.00 < r7/T2 < -11.50 \tag{16}$$

$$-15.00 < r7/(T3-T2) < -1.50 \tag{17}$$

$$0.15 < f1/f4 < 0.35 \tag{18}$$

$$-0.55 < f2/f4 < -0.30 \tag{19}$$

where
vd3: an abbe number at d-ray of the third lens L3,
vd4: an abbe number at d-ray of the fourth lens L4,
D3: a thickness along the optical axis of the third lens L3,
D4: a thickness along the optical axis of the fourth lens L4,
T2: a distance along the optical axis from an image-side surface of the second lens L2 to an object-side surface of the third lens L3,
T3: a distance along the optical axis from an image-side surface of the third lens L3 to an object-side surface of the fourth lens L4,
T4: a distance along the optical axis from an image-side surface of the fourth lens L4 to an object-side surface of the fifth lens L5,
f: a focal length of the overall optical system of the imaging lens,
f1: a focal length of the first lens L1,
f2: a focal length of the second lens L2,
f4: a focal length of the fourth lens L4,
r1: a paraxial curvature radius of an object-side surface of the first lens L1,
r2: a paraxial curvature radius of an image-side surface of the first lens L1,
r3: a paraxial curvature radius of an object-side surface of the second lens L2,
r5: a paraxial curvature radius of an object-side surface of the third lens L3,
r6: a paraxial curvature radius of an image-side surface of the third lens L3,
r7: a paraxial curvature radius of an object-side surface of the fourth lens L4, and
r8: a paraxial curvature radius of an image-side surface of the fourth lens L4.

It is not necessary to satisfy the above all conditional expressions, and by satisfying the conditional expression individually, operational advantage corresponding to each conditional expression can be obtained.

The imaging lens according to the present embodiments shows further preferable effect by satisfying the following conditional expressions (1a) to (19a):

$$14.00 < vd4 < 24.00 \tag{1a}$$

$$4.00 < r1 \times |r2|/f < 8.50 \tag{2a}$$

$$-0.95 < r3/r7 < -0.40 \tag{3a}$$

$$3.65 < (D4/f4) \times 100 < 8.50 \tag{4a}$$

$$2.55 < |r2|/f < 6.50 \tag{5a}$$

$$-16.00 < |r2|/r8 < -4.00 \tag{6a}$$

$$1.45 < |r5|/r6 < 2.70 \tag{7a}$$

$$0.95 < |r5|/r6/r1 < 1.95 \tag{8a}$$

$$1.35 < f4/f < 2.60 \tag{9a}$$

$$51.00 < vd3 < 61.00 \tag{10a}$$

$$2.50 < (T2/f) \times 100 < 6.25 \tag{11a}$$

$$0.15 < D3/(T3-T2) < 0.25 \tag{12a}$$

$2.20 < D4/T4 < 6.50$ (13a)

$1.80 < (T4/f) \times 100 < 5.00$ (14a)

$-5.00 < |r2|/r3/r8 < -0.60$ (15a)

$-85.00 < r7/T2 < -12.50$ (16a)

$-12.00 < r7/(T3-T2) < -2.20$ (17a)

$0.18 < f1/f4 < 0.30$ (18a)

$-0.48 < f2/f4 < -0.35$. (19a)

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} + A_{18} H^{18} + A_{20} H^{20}$$ [Equation 1]

Next, examples of the imaging lens according to this embodiment will be explained. In each example, f denotes a focal length of the overall optical system of the imaging lens, Fno denotes an F-number, w denotes a half field of view, ih denotes a maximum image height, and TTL denotes a total track length. Additionally, i denotes a surface number counted from the object side, r denotes a paraxial curvature radius, d denotes a distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

| Example 1 |
| --- |
| Unit mm |
| f = 5.80 |
| Fno = 2.60 |
| ω(°) = 24.0 |
| ih = 2.65 |
| TTL = 5.26 |

| Surface Data | | | | |
| --- | --- | --- | --- | --- |
| i | r | d | Nd | vd |
| (Object) | Infinity | Infinity | | |
| 1* | 1.4198 | 0.9000 | 1.544 | 55.93 (vd1) |
| 2* | 25.4659 | 0.0531 | | |
| 3* | 7.0447 | 0.2400 | 1.661 | 20.37 (vd2) |
| 4* | 2.2565 | 0.2275 | | |
| (Stop) | Infinity | −0.0440 | | |
| 6* | 3.3654 | 0.2600 | 1.535 | 55.69 (vd3) |
| 7* | 2.1197 | 1.5701 | | |
| 8* | −13.2880 | 0.5726 | 1.671 | 19.24 (vd4) |
| 9* | −5.6230 | 0.2372 | | |
| 10* | −2.9044 | 0.3786 | 1.535 | 55.69 (vd5) |
| 11* | −13.4132 | 0.6102 | | |
| 12 | Infinity | 0.2100 | 1.517 | 64.20 |
| 13 | Infinity | 0.1142 | | |
| 14 Image Plane | Infinity | | | |

| Constituent Lens Data | | |
| --- | --- | --- |
| Lens | Start Surface | Focal Length |
| 1 | 1 | 2.727 |
| 2 | 3 | −5.127 |
| 3 | 6 | −11.547 |
| 4 | 8 | 14.110 |
| 5 | 10 | −7.020 |

| Aspheric Surface Data | | | | | |
| --- | --- | --- | --- | --- | --- |
| | First Surface | Second Surface | Third Surface | Fourth Surface | Sixth Surface |
| k | −6.588456E−03 | 0.000000E+00 | 0.000000E+00 | 1.700524E+00 | 0.000000E+00 |
| A4 | −1.361478E−03 | 5.021949E−03 | 2.369351E−03 | 3.075795E−02 | 6.473803E−02 |
| A6 | 1.159582E−04 | 1.816469E−02 | 1.608441E−01 | 4.865807E−01 | −4.368833E−01 |
| A8 | −5.169160E−03 | 2.413699E−02 | −2.992783E−01 | −2.415816E+00 | 3.621573E+00 |
| A10 | 2.829951E−03 | −3.660923E−02 | 7.725731E−01 | 1.012343E+01 | −1.508344E+01 |

TABLE 1-continued

Example 1
Unit mm
f = 5.80
Fno = 2.60
ω(°) = 24.0
h = 2.65
TTL = 5.26

| | | | | | |
|---|---|---|---|---|---|
| A12 | −2.686879E−03 | −6.718780E−03 | −1.256259E+00 | −2.179693E+01 | 3.504419E+01 |
| A14 | 1.225598E−03 | 3.253793E−02 | 1.061501E+00 | 2.352764E+01 | −4.255383E+01 |
| A16 | −5.995164E−04 | −1.373917E−02 | −3.511328E−01 | −9.157153E+00 | 2.127053E+01 |
| A18 | 0.000000E+00 | 0.000000E+00 | 0.000000E+00 | 0.000000E+00 | 1.719063E−01 |
| A20 | 0.000000E+00 | 0.000000E+00 | 0.000000E+00 | 0.000000E+00 | 0.000000E+00 |

| | Seventh Surface | Eighth Surface | Ninth Surface | Tenth Surface | Eleventh Surface |
|---|---|---|---|---|---|
| k | 0.000000E+00 | 0.000000E+00 | 0.000000E+00 | 5.203101E−01 | −7.884228E+01 |
| A4 | 8.921880E−02 | −2.463007E−02 | −5.043530E−02 | −2.368133E−01 | −2.271601E−01 |
| A6 | −2.995977E−01 | −2.500153E−02 | −5.944369E−03 | 4.109573E−01 | 3.372931E−01 |
| A8 | 1.401276E+00 | 2.262694E−02 | 5.632879E−02 | −3.685809E−01 | −2.931077E−01 |
| A10 | −2.655455E+00 | 2.579428E−02 | −5.495915E−02 | 2.137729E−01 | 1.597987E−01 |
| A12 | −2.502801E+00 | −7.031459E−02 | 2.323113E−02 | −8.304822E−02 | −5.663645E−02 |
| A14 | 1.801201E+01 | 5.788000E−02 | −4.868683E−03 | 2.152856E−02 | 1.310494E−02 |
| A16 | −2.612400E+01 | −2.323791E−02 | 5.195448E−04 | −3.561515E−03 | −1.923596E−03 |
| A18 | 1.276000E+01 | 4.656122E−03 | −3.437988E−05 | 3.391224E−04 | 1.635383E−04 |
| A20 | 0.000000E+00 | −3.729482E−04 | 2.182131E−06 | −1.412472E−05 | −6.147683E−06 |

The imaging lens in Example 1 satisfies conditional expressions (1) to (19) as shown in Table 5.

Figure 1:
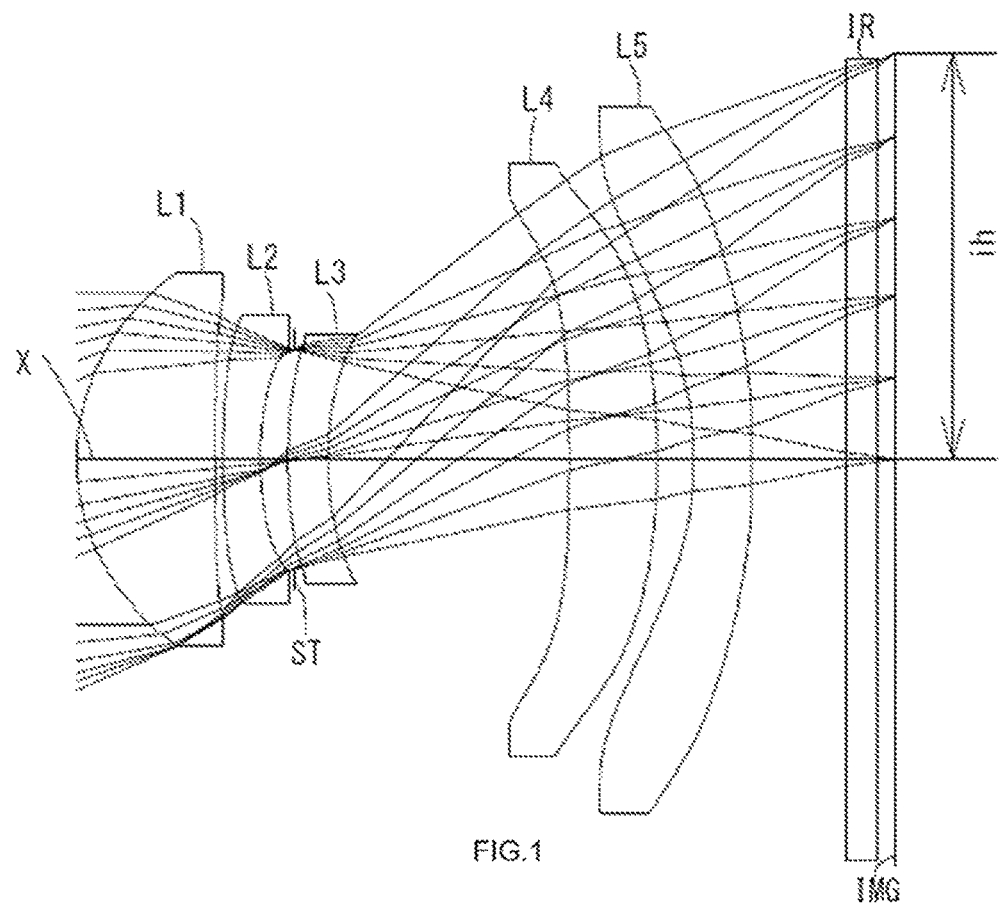
FIG. 1 is a schematic view showing an imaging lens in Example 1 according to the present invention.
Figure 2:
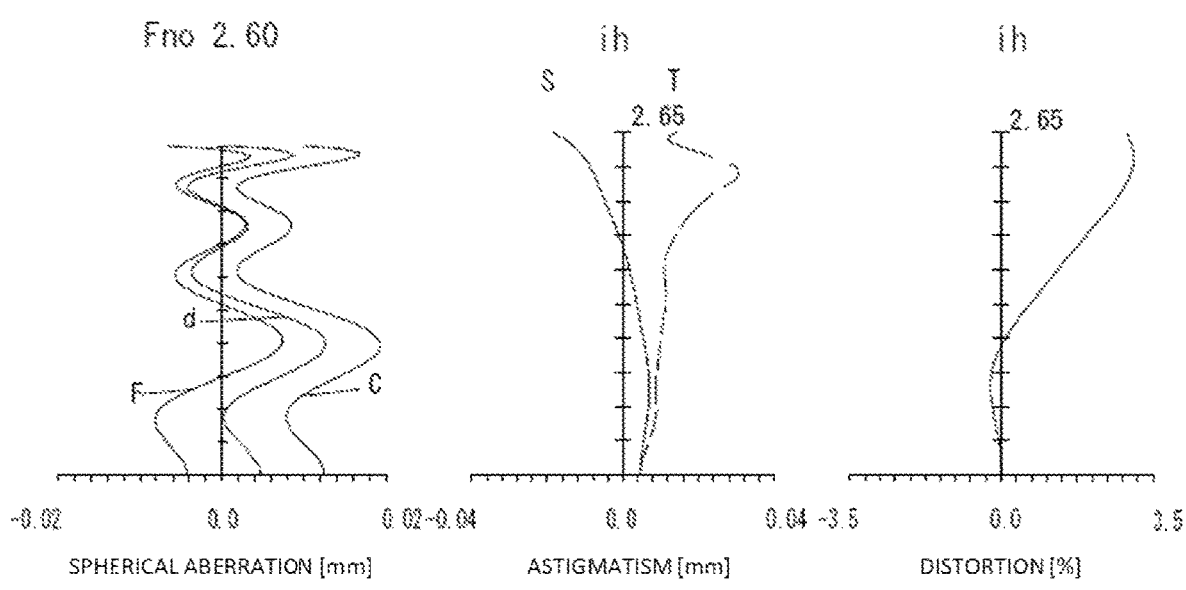
FIG. 2 shows spherical aberration, astigmatism, and distortion of the imaging lens in Example 1 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and the amount of aberration at d-ray on tangential image surface T (broken line), respectively (same as FIGS. 4, 6 and 8). As shown in FIG. 2, each aberration is corrected excellently.

Example 2

The basic lens data is shown below in Table 2.

TABLE 2

Example 2
Unit mm
f = 5.86
Fno = 2.60
ω(°) = 24.0
h = 2.65
TTL = 5.23

Surface Data

| i | r | d | Nd | vd |
|---|---|---|---|---|
| (Object) | Infinity | Infinity | | |
| 1* | 1.4509 | 0.8736 | 1.544 | 55.93 (vd1) |
| 2* | −16.7474 | 0.0300 | | |
| 3* | 4.2508 | 0.2400 | 1.661 | 20.37 (vd2) |
| 4* | 1.7886 | 0.2226 | | |
| (Stop) | Infinity | 0.1021 | | |
| 6* | −13.2075 | 0.2600 | 1.535 | 55.69 (vd3) |
| 7* | 7.0841 | 1.4449 | | |
| 8* | −6.9910 | 0.6311 | 1.671 | 19.24 (vd4) |
| 9* | −3.9021 | 0.1959 | | |
| 10* | −2.9179 | 0.4149 | 1.535 | 55.69 (vd5) |
| 11* | Infinity | 0.5750 | | |
| 12 | Infinity | 0.2100 | 1.517 | 64.20 |
| 13 | Infinity | 0.1002 | | |
| 14 | Infinity | | | |
| Image Plane | | | | |

Constituent Lens Data

| Lens | Start Surface | Focal Length |
|---|---|---|
| 1 | 1 | 2.495 |
| 2 | 3 | 4.862 |
| 3 | 6 | −8.583 |

TABLE 2-continued

Example 2
Unit mm
f = 5.86
Fno = 2.60
ω(°) = 24.0
h = 2.65
TTL = 5.23

| | | |
|---|---|---|
| 4 | 8 | 12.169 |
| 5 | 10 | −5.456 |

Aspheric Surface Data

| | First Surface | Second Surface | Third Surface | Fourth Surface | Sixth Surface |
|---|---|---|---|---|---|
| k | 1.653765E−01 | 0.000000E+00 | 0.000000E+00 | −1.936409E+00 | 0.000000E+00 |
| A4 | −5.825023E−03 | 2.863207E−02 | −7.328383E−02 | −3.031466E−02 | 1.871475E−01 |
| A6 | −2.908529E−03 | 1.628884E−03 | 1.561475E−01 | 4.521889E−01 | −3.589476E−01 |
| A8 | −6.649254E−03 | 2.558630E−02 | −1.942164E−01 | −1.907027E+00 | 3.109420E+00 |
| A10 | 1.835901E−03 | −1.609026E−02 | 5.553624E−01 | 7.875217E+00 | −1.317657E+01 |
| A12 | −1.657114E−03 | −1.412828E−02 | −9.555361E−01 | −1.684723E+01 | 2.989366E+01 |
| A14 | 1.620813E−03 | 1.284660E−02 | 7.378946E−01 | 1.828901E+01 | −3.472133E+01 |
| A16 | −8.679154E−04 | −1.342835E−03 | −2.166766E−01 | −8.119346E+00 | 1.594615E+01 |
| A18 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 |

| | Seventh Surface | Eighth Surface | Ninth Surface | Tenth Surface | Eleventh Surface |
|---|---|---|---|---|---|
| k | 0.000000E+00 | 0.000000E+00 | 0.000000E+00 | 1.409764E−01 | 0.000000E+00 |
| A4 | 1.644761E−01 | 2.871126E−02 | 2.948014E−02 | −2.677537E−01 | −3.379741E−01 |
| A6 | 4.761770E−01 | −1.882317E−01 | −1.739812E−01 | 5.258554E−01 | 5.449252E−01 |
| A8 | −2.403781E+00 | 2.934166E−01 | 2.627345E−01 | −5.502525E−01 | −4.992399E−01 |
| A10 | 6.490712E+00 | −2.497658E−01 | −2.183721E−01 | 3.528743E−01 | 2.801458E−01 |
| A12 | −9.698853E+00 | 1.157075E−01 | 1.085475E−01 | −1.430033E−01 | −1.007212E−01 |
| A14 | 7.100000E+00 | −2.533000E−02 | −3.287407E−02 | 3.692509E−02 | 2.337357E−02 |
| A16 | −2.000000E+00 | −8.227054E−06 | 5.839352E−03 | −5.902080E−03 | −3.395015E−03 |
| A18 | 0.000000E+00 | 1.074584E−03 | −5.380203E−04 | 5.332030E−04 | 2.811402E−04 |
| A20 | 0.000000E+00 | −1.440677E−04 | 1.827723E−05 | −2.085291E−05 | −1.013249E−05 |

The imaging lens in Example 2 satisfies conditional expressions (1) to (19) as shown in Table 5.

Figure 4:
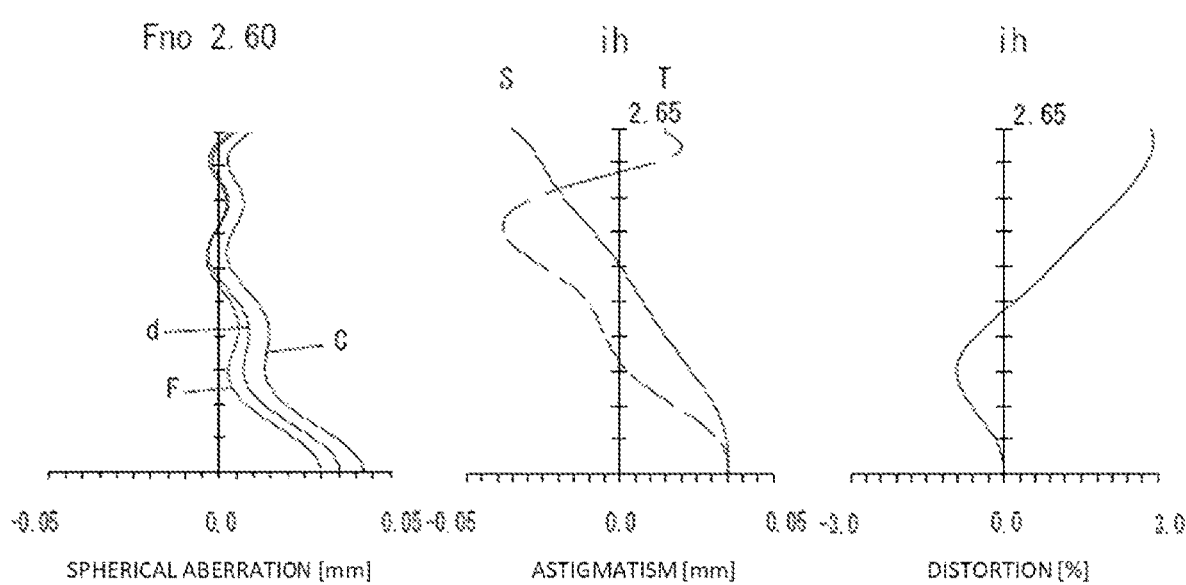
FIG. 4 shows spherical aberration, astigmatism, and distortion of the imaging lens in Example 2 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3
Unit mm
f = 6.10
Fno = 2.60
ω(°) = 22.7
h = 2.65
TTL = 5.26

Surface Data

| i | r | d | Nd | vd |
|---|---|---|---|---|
| (Object) | Infinity | Infinity | | |
| 1* | 1.4310 | 0.8516 | 1.544 | 55.93 (vd1) |
| 2* | −31.9279 | 0.1364 | | |
| (Stop) | Infinity | 0.0000 | | |
| 4* | 2.9096 | 0.2400 | 1.661 | 20.37 (vd2) |
| 5* | 1.3122 | 0.3023 | | |
| 6* | 9.2127 | 0.2601 | 1.535 | 55.69 (vd3) |
| 7* | 3.7702 | 1.5305 | | |
| 8* | −3.8908 | 0.7029 | 1.671 | 19.24 (vd4) |
| 9* | −2.5437 | 0.1261 | | |
| 10* | −2.2753 | 0.3500 | 1.535 | 55.69 (vd5) |
| 11* | −9.0351 | 0.0857 | | |
| 12 | Infinity | 0.2100 | 1.517 | 64.20 |
| 13 | Infinity | 0.5340 | | |
| 14 | Infinity | | | |
| Image Plane | | | | |

TABLE 3-continued

Example 3
Unit mm
f = 6.10
Fno = 2.60
ω(°) = 22.7
h = 2.65
TTL = 5.26

Constituent Lens Data

| Lens | Start Surface | Focal Length |
|---|---|---|
| 1 | 1 | 2.539 |
| 2 | 4 | −3.847 |
| 3 | 6 | −12.135 |
| 4 | 8 | 9.056 |
| 5 | 10 | −5.791 |

Aspheric Surface Data

|  | First Surface | Second Surface | Fourth Surface | Fifth Surface | Sixth Surface |
|---|---|---|---|---|---|
| k | 0.000000E+00 | 0.000000E+00 | 0.000000E+00 | 0.000000E+00 | 0.000000E+00 |
| A4 | −2.253422E−02 | −1.364740E−02 | −1.776087E−01 | −2.255569E−01 | 2.035696E−01 |
| A6 | 7.273765E−02 | 2.866077E−01 | 8.730512E−01 | 1.675486E+00 | −6.552966E−01 |
| A8 | −1.551822E−01 | −6.344121E−01 | −1.897703E+00 | −5.611616E+00 | 6.328115E+00 |
| A10 | 1.850978E−01 | 7.813626E−01 | 2.531389E+00 | 1.515057E+01 | −2.502062E+01 |
| A12 | −1.229188E−01 | −5.295403E−01 | −1.965411E+00 | −2.421442E+01 | 5.456858E+01 |
| A14 | 4.208455E−02 | 1.713343E−01 | 6.378663E−01 | 2.028192E+01 | −6.233919E+01 |
| A16 | −5.204214E−03 | −1.673026E−02 | −2.567014E−03 | −6.699870E+00 | 2.900120E+01 |
| A18 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 |

|  | Seventh Surface | Eighth Surface | Ninth Surface | Tenth Surface | Eleventh Surface |
|---|---|---|---|---|---|
| k | 0.000000E+00 | 0.000000E+00 | 0.000000E+00 | 0.000000E+00 | 0.000000E+00 |
| A4 | 9.778173E−02 | −1.442120E−03 | −4.134379E−02 | −2.543895E−01 | −2.536369E−01 |
| A6 | 1.095511E+00 | 2.705147E−03 | −1.245955E−03 | 2.405721E−01 | 2.654426E−01 |
| A8 | −5.834231E+00 | −1.948286E−03 | 5.255195E−02 | −5.390264E−02 | −1.753572E−01 |
| A10 | 1.896072E+01 | 6.303176E−03 | −5.542458E−02 | −3.454756E−02 | 8.826430E−02 |
| A12 | −3.570539E+01 | 1.409097E−02 | 2.403931E−02 | 2.608075E−02 | −3.306800E−02 |
| A14 | 3.558032E+01 | −1.277823E−02 | −3.638243E−03 | −7.064822E−03 | 8.370310E−03 |
| A16 | −1.400020E+01 | 4.603927E−03 | −3.683206E−04 | 9.231779E−04 | −1.304219E−03 |
| A18 | 0.000000E+00 | −7.964212E−04 | 1.677982E−04 | −5.469318E−05 | 1.098477E−04 |
| A20 | 0.000000E+00 | 5.467694E−05 | −1.369040E−05 | 1.005558E−06 | −3.657676E−06 |

The imaging lens in Example 3 satisfies conditional expressions (1) to (19) as shown in Table 5.

Figure 6:
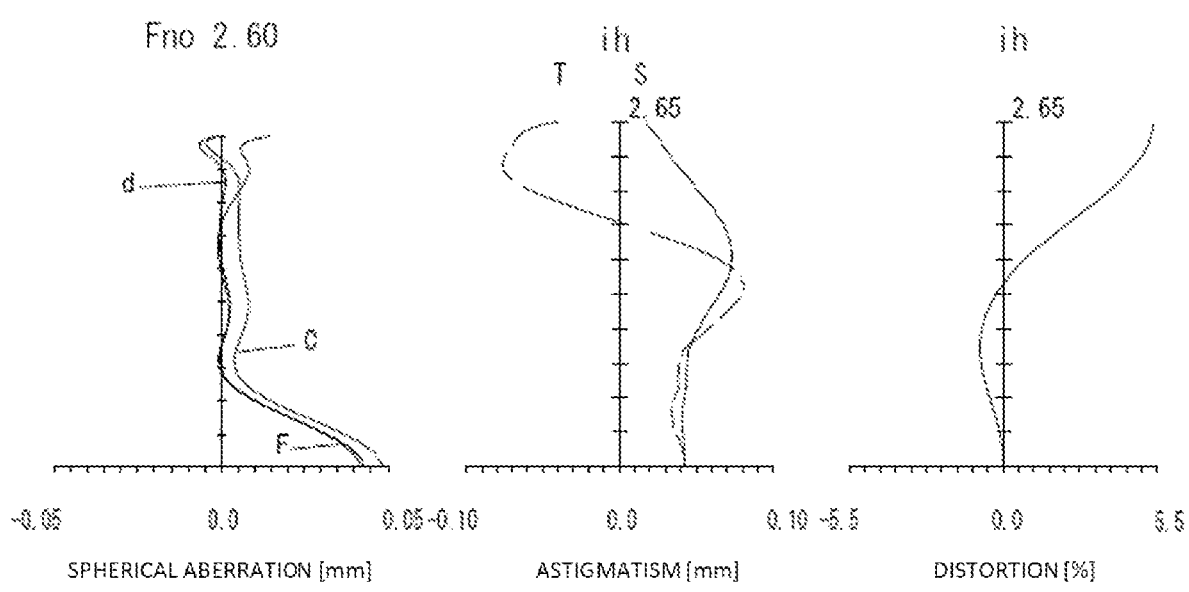
FIG. 6 shows spherical aberration, astigmatism, and distortion of the imaging lens in Example 3 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4
Unit mm
f = 6.10
Fno = 2.60
ω(°) = 22.7
h = 2.65
TTL = 5.26

Surface Data

| i | r | d | Nd | vd |
|---|---|---|---|---|
| (Object) | Infinity | Infinity | | |
| 1* | 1.4002 | 0.8733 | 1.544 | 55.93 (vd1) |
| 2* | −36.6420 | 0.1519 | | |
| (Stop) | Infinity | −0.0706 | | |
| 4* | 3.4058 | 0.2400 | 1.661 | 20.37 (vd2) |
| 5* | 1.4845 | 0.2684 | | |
| 6* | 6.3691 | 0.2800 | 1.535 | 55.69 (vd3) |
| 7* | 2.6984 | 1.5535 | | |
| 8* | −3.6057 | 0.7127 | 1.671 | 19.24 (vd4) |
| 9* | −2.4438 | 0.1209 | | |
| 10* | −2.3074 | 0.3700 | 1.535 | 55.69 (vd5) |

TABLE 4-continued

Example 4
Unit mm
f = 6.10
Fno = 2.60
ω(°) = 22.7
h = 2.65
TTL = 5.26

| | | | | |
|---|---|---|---|---|
| 11* | −9.1972 | 0.0857 | | |
| 12 | Infinity | 0.2100 | 1.517 | 64.20 |
| 13 | Infinity | 0.5337 | | |
| 14 | Infinity | | | |
| Image Plane | | | | |

Constituent Lens Data

| Lens | Start Surface | Focal Length |
|---|---|---|
| 1 | 1 | 2.498 |
| 2 | 4 | 4.191 |
| 3 | 6 | −8.994 |
| 4 | 8 | 9.073 |
| 5 | 10 | −5.869 |

Aspheric Surface Data

| | First Surface | Second Surface | Fourth Surface | Fifth Surface | Sixth Surface |
|---|---|---|---|---|---|
| k | 0.000000E+00 | 0.000000E+00 | 0.000000E+00 | 0.000000E+00 | 0.000000E+00 |
| A4 | −1.494161E−02 | −2.995670E−02 | −1.773304E−01 | −1.454003E−01 | 1.713336E−01 |
| A6 | 5.529447E−02 | 3.947831E−01 | 8.917316E−01 | 1.038495E+00 | −3.913365E−01 |
| A8 | −1.363749E−01 | −9.531307E−01 | −1.868029E+00 | −1.752302E+00 | 4.256318E+00 |
| A10 | 1.877971E−01 | 1.344484E+00 | 2.555199E+00 | 2.430334E+00 | −1.688185E+01 |
| A12 | −1.530608E−01 | −1.094908E+00 | −1.958897E+00 | 9.724032E−01 | 3.773339E+01 |
| A14 | 6.840724E−02 | 4.739187E−01 | 5.867286E−01 | −4.984617E+00 | 4.400519E+01 |
| A16 | −1.243280E−02 | −8.545067E−02 | 2.168086E−03 | 3.316440E+00 | 2.108386E+01 |
| A18 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 |

| | Seventh Surface | Eighth Surface | Ninth Surface | Tenth Surface | Eleventh Surface |
|---|---|---|---|---|---|
| k | 0.000000E+00 | 0.000000E+00 | 0.000000E+00 | 0.000000E+00 | 0.000000E+00 |
| A4 | 3.921913E−02 | 1.388387E−02 | 2.028305E−02 | −1.809970E−01 | −2.535957E−01 |
| A6 | 2.053414E+00 | −7.031708E−02 | −1.257567E−01 | 1.669357E−01 | 3.043765E−01 |
| A8 | −1.452969E+01 | 1.253581E−01 | 1.956668E−01 | −6.263226E−02 | −2.463171E−01 |
| A10 | 5.977946E+01 | −1.479080E−01 | −1.542256E−01 | 2.384968E−02 | 1.398131E−01 |
| A12 | −1.410471E+02 | 1.138070E−01 | 6.946077E−02 | −1.853522E−02 | −5.347269E−02 |
| A14 | 1.768266E+02 | −5.362913E−02 | −1.826265E−02 | 9.856137E−03 | 1.312344E−02 |
| A16 | −9.020000E+01 | 1.499858E−02 | 2.780759E−03 | −2.636714E−03 | −1.945203E−03 |
| A18 | 0.000000E+00 | −2.289630E−03 | −2.266804E−04 | 3.418836E−04 | 1.545513E−04 |
| A20 | 0.000000E+00 | 1.465282E−04 | 7.470985E−06 | −1.727727E−05 | 4.784406E−06 |

The imaging lens in Example 4 satisfies conditional expressions (1) to (19) as shown in Table 5.

Figure 8:
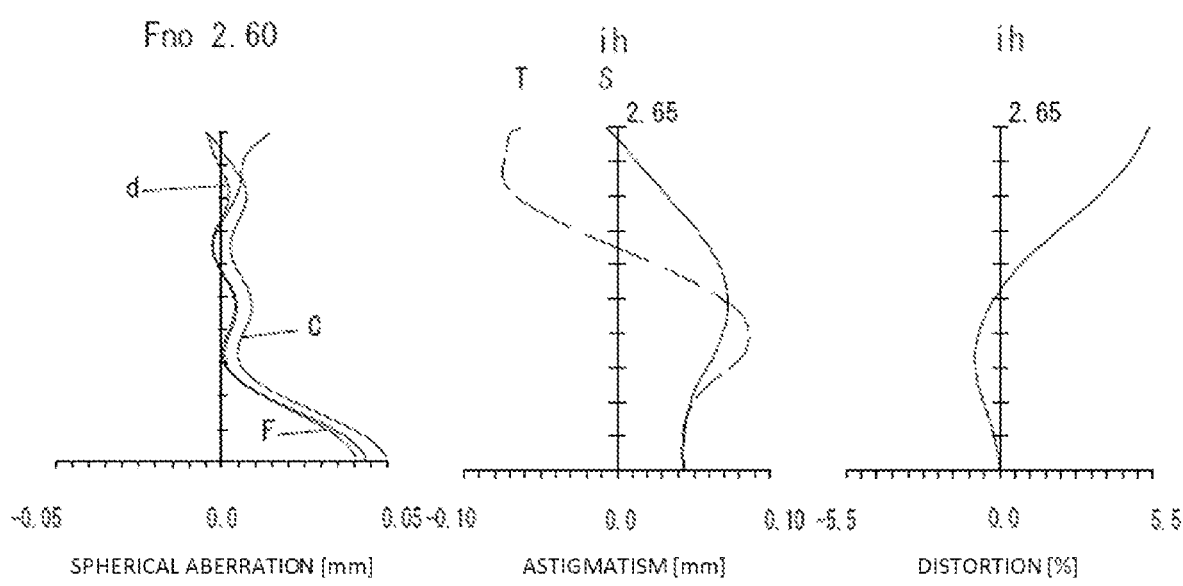
FIG. 8 shows spherical aberration, astigmatism, and distortion of the imaging lens in Example 4 according to the present invention.

FIG. 8 shows spherical aberration (mm), astigmatism (mm), and distortion (%) of the imaging lens in Example 4. As shown in FIG. 8, each aberration is corrected excellently.

In table 5, values of conditional expressions (1) to (19) related to Examples 1 to 4 are shown.

TABLE 5

| Conditional Expressions | Example 1 | Example 2 | Example 3 | Example 4 |
|---|---|---|---|---|
| (1) vd4 | 19.24 | 19.24 | 19.24 | 19.24 |
| (2) r1 × |r2|/f | 6.24 | 4.15 | 7.49 | 8.41 |
| (3) r3/r7 | −0.53 | −0.61 | −0.75 | −0.94 |
| (4) (D4/f4) × 100 | 4.06 | 5.19 | 7.76 | 7.85 |
| (5) |r2|/f | 4.39 | 2.86 | 5.23 | 6.00 |
| (6) |r2|/r8 | −4.53 | 4.29 | −12.55 | −14.99 |
| (7) |r5|/r6 | 1.59 | 1.86 | 2.44 | 2.36 |
| (8) |r5|/r6/r1 | 1.12 | 1.28 | 1.71 | 1.69 |
| (9) f4/f | 2.43 | 2.08 | 1.48 | 1.49 |
| (10) vd3 | 55.69 | 55.69 | 55.69 | 55.69 |
| (11) (T2/f) × 100 | 3.17 | 5.54 | 4.95 | 4.40 |
| (12) D3/(T3 − T2) | 0.19 | 0.23 | 0.21 | 0.22 |
| (13) D4/T4 | 2.41 | 3.22 | 5.57 | 5.90 |
| (14) (T4/f) × 100 | 4.09 | 3.35 | 2.07 | 1.98 |
| (15) |r2|/r3/r8 | −0.64 | −1.01 | 4.31 | 4.40 |
| (16) r7/T2 | −72.42 | −21.54 | −12.87 | −13.44 |
| (17) r7/(T3 − T2) | −9.58 | −6.24 | −3.17 | −2.81 |
| (18) f1/f4 | 0.19 | 0.21 | 0.28 | 0.28 |
| (19) f2/f4 | −0.36 | −0.40 | −0.42 | −0.46 |

When the imaging lens according to the present invention is adopted to a product with the camera function, there is realized contribution to the low profile and the low F-number of the camera and also high performance thereof.

DESCRIPTION OF REFERENCE NUMERALS

ST: aperture stop
L1: first lens
L2: second lens

L3: third lens
L4: fourth lens
L5: fifth lens
ih: maximum image height
IR: filter
IMG: imaging plane

What is claimed is:

1. An imaging lens comprising in order from an object side to an image side,
 a first lens with positive refractive power having an object-side surface being convex in a paraxial region,
 a second lens with negative refractive power having an object-side surface being convex in a paraxial region,
 a third lens with negative refractive power having an image-side surface being concave in a paraxial region,
 a fourth lens with positive refractive power in a paraxial region, and
 a fifth lens with negative refractive power having an object-side surface being concave in a paraxial region,
 wherein the imaging lens has only five lenses with refractive power, and
 the following conditional expressions (1), (2), (3), and (7) are satisfied:

$$9.00 < vd4 < 29.00 \tag{1}$$

$$3.70 < r1 \times |r2|/f < 8.75 \tag{2}$$

$$-1.00 < r3/r7 < -0.25 \tag{3}$$

$$1.30 < |r5|/r6 < 3.00 \tag{7}$$

where
vd4: an abbe number at d-ray of the fourth lens,
r1: a paraxial curvature radius of an object-side surface of the first lens,
r2: a paraxial curvature radius of an image-side surface of the first lens,
f: a focal length of the overall optical system of the imaging lens,
r3: a paraxial curvature radius of an object-side surface of the second lens,
r7: a paraxial curvature radius of an object-side surface of the fourth lens,
r5: a paraxial curvature radius of an object-side surface of the third lens, and
r6: a paraxial curvature radius of an image-side surface of the third lens.

2. The imaging lens according to claim 1, wherein the following conditional expression (4) is satisfied:

$$3.25 < (D4/f4) \times 100 < 9.50 \tag{4}$$

where
D4: a thickness along the optical axis of the fourth lens, and
f4: a focal length of the fourth lens.

3. The imaging lens according to claim 1, wherein the following conditional expression (5) is satisfied:

$$2.30 < |r2|/f < 7.00 \tag{5}$$

where
r2: a paraxial curvature radius of an image-side surface of the first lens, and
f: a focal length of the overall optical system of the imaging lens.

4. The imaging lens according to claim 1, wherein the following conditional expression (6) is satisfied:

$$-17.00 < |r2|/r8 < -3.50 \tag{6}$$

where
r2: a paraxial curvature radius of an image-side surface of the first lens, and
r8: a paraxial curvature radius of an image-side surface of the fourth lens.

5. The imaging lens according to claim 1, wherein the following conditional expression (8) is satisfied:

$$0.80 < |r5|/r6/r1 < 2.20 \tag{8}$$

where
r5: a paraxial curvature radius of an object-side surface of the third lens,
r6: a paraxial curvature radius of an image-side surface of the third lens, and
r1: a paraxial curvature radius of an object-side surface of the first lens.

6. The imaging lens according to claim 1, wherein the following conditional expression (9) is satisfied:

$$1.20 < f4/f < 30.00 \tag{9}$$

where
f4: a focal length of the fourth lens, and
f: a focal length of the overall optical system of the imaging lens.

* * * * *